(12) United States Patent
Lakhani et al.

(10) Patent No.: US 10,454,662 B2
(45) Date of Patent: Oct. 22, 2019

(54) DUPLEXER WITH SIGNAL CANCELLATION

(71) Applicants: Abdul-Karim Lakhani, Burnaby (CA); Harry Davis, Victoria (CA)

(72) Inventors: Abdul-Karim Lakhani, Burnaby (CA); Harry Davis, Victoria (CA)

( * ) Notice: Subject to any disclaimer, the term of this patent is extended or adjusted under 35 U.S.C. 154(b) by 268 days.

(21) Appl. No.: 15/039,640

(22) PCT Filed: Nov. 21, 2014

(86) PCT No.: PCT/CA2014/051112
§ 371 (c)(1),
(2) Date: May 26, 2016

(87) PCT Pub. No.: WO2015/077876
PCT Pub. Date: Jun. 4, 2015

(65) Prior Publication Data
US 2017/0207902 A1 Jul. 20, 2017

(30) Foreign Application Priority Data
Nov. 26, 2013 (CA) .................................... 2834725

(51) Int. Cl.
*H04L 5/14* (2006.01)
*H04B 1/525* (2015.01)
*H04B 7/26* (2006.01)

(52) U.S. Cl.
CPC ........... *H04L 5/1461* (2013.01); *H04B 1/525* (2013.01); *H04B 7/2628* (2013.01)

(58) Field of Classification Search
None
See application file for complete search history.

(56) References Cited

U.S. PATENT DOCUMENTS

| 6,108,313 A | 8/2000 | Lee et al. | |
|---|---|---|---|
| 6,472,952 B1 * | 10/2002 | Sakai | H04B 1/18 333/126 |
| 2003/0174763 A1 * | 9/2003 | Kouki | H04B 1/525 375/219 |
| 2004/0014449 A1 | 1/2004 | Adachi et al. | |
| 2005/0107051 A1 * | 5/2005 | Aparin | H04B 1/525 455/126 |

(Continued)

OTHER PUBLICATIONS

International Search Report Corresponding to PCT/CA2014/051112 dated Mar. 11, 2015.

(Continued)

*Primary Examiner* — Jamaal Henson
(74) *Attorney, Agent, or Firm* — Davis & Bujold PLLC; Michael J. Bujold

(57) ABSTRACT

There is provided a duplexer having first, second and third ports and adapted for connection between an antenna and uplink and downlink, respectively, in a full duplex communication system. The duplexer has first and second quarter wave transformers connected between the first and third and between the first and second ports, respectively. The duplexer has a balancing resistor connected between the third port and the output of the second transformer. The duplexer has a filter circuit connected between the output of the second transformer and the second port.

13 Claims, 6 Drawing Sheets

(56) References Cited

U.S. PATENT DOCUMENTS

| | | | |
|---|---|---|---|
| 2005/0195790 A1* | 9/2005 | Learned | H04B 1/7105 |
| | | | 370/342 |
| 2008/0139149 A1* | 6/2008 | Mu | H03D 7/1441 |
| | | | 455/200.1 |
| 2008/0227409 A1* | 9/2008 | Chang | H04B 1/525 |
| | | | 455/78 |
| 2009/0028074 A1* | 1/2009 | Knox | H01Q 9/0435 |
| | | | 370/278 |
| 2011/0164538 A1* | 7/2011 | Karr | H04W 76/10 |
| | | | 370/281 |
| 2014/0011464 A1* | 1/2014 | Anderson | H04B 1/525 |
| | | | 455/78 |

OTHER PUBLICATIONS

Written Opinion Corresponding to PCT/CA2014/051112 dated Mar. 11, 2015.

* cited by examiner

DUPLEXER WITH SIGNAL CANCELLATION

FIELD

This relates to a duplexer with signal cancellation for use in two-way wireless communication systems and illustratively in customer premises equipment for full duplex broadband systems operating in the UHF spectrum.

BACKGROUND

Rural communities around the world are in need of broadband services as is frequently commented on by governments and news media. The efforts to supply such services usually rely on setting up towers and transmitting at low power and at a high frequency range of well over 900 MHz. These systems are expensive and not economically feasible for areas with low population densities.

Recently, systems employing the 500-900 MHz range and operating in licensed UHF frequencies have been deployed in Canada to service First Nation Communities as well as rural communities. Such systems also require a tower. But the systems permit coverage of 2000 to 3000, or more, square kilometers rather than the 75-100 square kilometers covered by the systems using higher frequencies and lower power levels.

The system at the tower is in communication with a plurality of customers each of which has customer premises equipment (CPE). In a full duplex broadband system where high power signals are transmitted from a base station (the tower) to a plurality of customers premises equipment, these transmit signals, when received by customer premises equipment, have to be isolated from high power customer transmit signals. The isolation is accomplished traditionally by a duplexer. But in a full duplex broadband system, each customer premises equipment is assigned a different pair of transmit and received channel frequencies. Consequently, a duplexer of different specification is required for each customer.

The duplexer employs two multistage filters and is operative to allow bi-directional communication over a single antenna. For CPE, it operates to separate the receive signal from the transmit signal while permitting them to share a common antenna. The duplexer must be designed for operation in the frequency band (470-860 MHz) used by the receiver and transmitter and must be capable of handling the output power of the transmitter. Also, the duplexer must provide adequate rejection of transmitter noise occurring at the receive frequency and must be designed to operate at, or less than, the frequency separation between the transmitter and receiver. Since duplexers are not available which operate at a separation of less than 24 MHz, the frequencies for each CPE must be 24 MHz apart and each CPE requires a different unique duplexer.

The system (CPE) of FIG. 1 transmits, illustratively, at 713 MHz and receives at 743 MHz. At the CPE the transmit power of 25 dBm is much greater than the received power of −92 dBm.

Using the full duplex DOCSIS system for wireless connectivity at a customer location, it was found necessary to be able to transmit a signal that is 0.5 watts (or 500 mwatts or 76 dBmV into a 75 Ohms antenna and also receive a signal that is 1.000e-12 watts (or 1.000e-9 mwatts or −40 dBmV) on the same antenna. As can be seen the transmit signal is huge compared to the receive signal. To be able to use the same antenna for transmit and receive signals, it was necessary to have a duplexer that can separate the two signals and achieve a reasonable level of signal to noise ratio on the receive signal. The duplexer has to be able to provide greater than 110 dB of separation between the two signals. Making a duplexer that can achieve 110 dB of separation is extremely difficult. Only fixed frequency duplexers can be made with fixed frequency components. If the transmit and receive frequencies are close together (less than 18 MHz), it is next to impossible to make a duplexer that can achieve 110 dB of separation. Ceramic duplexers are the only ones that are of reasonable size and they have been used to-date to provide the separation. Each time a new pair of frequencies is used, a new ceramic duplexer has to be custom built. There is no easy way of creating a frequency agile duplexer or equivalent. Also the ceramic duplexers have not been able to achieve the separation needed and the receive signals are corrupted by the transmit signals. Much higher receive signals are needed to reduce the corruption of the receive signals by the transmit signals.

The CPE equipment has two limitations, which limit the area over which satisfactory system operation can occur. First, the duplexer has difficulties separating the transmit and receive channels from one another. The second limitation is due to the fact that the gain of the common antenna does not have to be the same for both the transmit and the receive signals. The problem thus is to eliminate the need for a different duplexer for each CPE or provide a frequency agile duplexer.

SUMMARY

According to an aspect, the present device relates to a Wilkinson combiner, which is normally operative to combine first and second signals at first and second input ports for output at a third port, that has a characteristic of responding to a single input signal at one of the input ports to cancel that signal at the second input port. That characteristic is turned to account herein by the addition of a filter at the second input port and operating that port as an output port. The resulting device was tested and exhibited over 40 dB of signal cancellation and an additional 80 dB of separation a result which was particularly attractive for use as a duplexer for two way communication systems, where a transmit signal at the first input port (the transmit port) is totally cancelled at the receive port and signals received at the $3^{rd}$ port arrive uncontaminated by the transmit signal.

Thus, according to an aspect, a signal combiner (plus a filter circuit) connected between a common antenna and the down link and uplink of a two-way communication system provides a much better result than does a conventional duplexer in preventing contamination of a receive signal in the downlink from high power signals in the uplink. Adapting a Wilkinson (or a hybrid) combiner by adding a filter circuit results in a duplexer with a cancellation portion and a separation portion which provided a surprising useful solution to the specific problem of customer premises equipment or the base station equipment in a way that's useful for all full-duplex communication systems.

One technique to reduce the corruption by the transmit signal of the receive signal is to utilize two separate antennas. One for transmit and a second for receive. This way there is no electrical connection between the two antennas. The corruption of the receive signals by the transmit signals is reduced since there is no electrical connection between the two signals. This requires mounting two antennas on a pole within close proximity. Plus the two antenna have to be aligned separately, they have to be spaced apart to achieve additional separation to reduce the corruption of the receive signal by the transmit signal. Even with a large separation between the two antennas the best possible separation with the two signals is less than 30 dB. The cost of this solution was high and required having two antennas, a solution too expensive for CPE. The two antennas system, however, was extremely useful for mounting on a tower as is explained in United States Patent and Trademark Office co-pending application Ser. No. 13/750,987, filed Jan. 25, 2013 for the present applicant.

Utilizing a Wilkinson combiner with a filter circuit a signal cancellation was achieved that provided over 40 dB between the two signals and 80 dB of separation due to the filter circuit. The signal cancellation filter circuit combination permits the use of the same antenna for transmit and receive signals.

In addition, the receive filter circuit no longer needs to have the same rating as the transmit band-pass filter. The transmit signal received on the receive port is over 40 dB less than the actual transmit signal and thus there is no need for a transmit filter at all.

When the Wilkinson is tuned correctly, over 50 dB of separation is achieved. The 80 dB of separation provided by the filter circuit and the addition of the cancellation portion provides an effective separation of over 120 dB, something that could not be achieved with ceramic duplexer or any other kinds of integratable duplexers. With this additional cancellation, even smaller signals can be received and much higher signal to noise ratio on the receive signal can be achieved. A much lower power rated receive filter circuit can also be used. Furthermore, the cancellation portion circuit can be made to work over a broad frequency spectrum by using a multistage Wilkinson. With the additional 40 dB of cancellation, transmit and receive signals could also be much closer in frequency than is possible with conventional duplexers, almost vanishingly close.

One of the drawbacks of the Wilkinson combiner is that 3 dB of power is lost on the transmit signal and also 3 dB of power is lost on the receive signal. But in view of the additional over 40 dB of isolation this is a small price to pay. It may also be possible to use an uneven power rating on the Wilkinson combiner to reduce the power loss on the receive signal or the transmit signal.

The same cancellation filter circuit combination (cancellation/separation duplexer) can be used in any full duplex communication system where a duplexer is utilized today be it Tower, Customer Premise Equipment or Mobile communication system. Currently, most mobile communication system are half-duplex since there is a problem separating the transmit and receive frequencies since high quality duplexers are not easily made and high separation between the two signals is extremely difficult to achieve. With the Wilkinson combiner and filter circuit combination there is provided an extremely large separation between the two isolated signals.

With the initial cancellation, between the two signals, the addition of a heterodyne circuit creates a frequency agile transceiver, see FIG. 4.

Accordingly, there is provided a duplexer having first, second and third ports and adapted for connection between an antenna and uplink and downlink, respectively, in a full duplex communication system.

According to an aspect, the duplexer comprises first and second quarter wave transformers connected between said first and third and between said first and second ports, respectively, a balancing resistor connected between said third port and the output of said second transformer, and a filter circuit connected between said output of said second transformer and said second port.

In some aspects, the filter circuit of the duplexer may comprise a bandpass filter or a heterodyne receiver.

In some aspects the duplexer may be in combination with an antenna connected to said first port and an uplink and a downlink of a two-way communication system connected to said third port and said second port respectively. The antenna may be located exterior to a customer premises in a wireless full duplex communication system between equipment in each of a plurality of customers premises and a tower in the base station of said system, said combination in each of the customer premises equipment comprising a heterodyne circuit for providing a frequency agile circuit for passing each frequency of each different pair of spaced apart frequencies assigned to each of said customers.

In some aspects, there may be a mobile device comprising a duplexer having some or all of the aspects described above, and there may be a plurality of mobile devices in communication with a base station.

According to an aspect, there is provided a duplexer operative to provide a signal cancellation and separation for connection between an antenna and a downlink and an uplink of a full duplex communication system.

In some aspects, the duplexer of the communication system comprises first, second, and third ports; first and second like quarter wave transformers connected between said first port and said second port and between said first port and said third port, respectively; a filter circuit connected between said first quarter wave transformer and said second port; and a balancing resistor connected at one end to said first output port and to a point between said first quarter wave transformer and said filter at the other end.

In some aspects, there may be a duplexer with one or more features described herein that are attributed to duplexers in combination with an antenna connected to the first port. There may be a down link and an uplink connected to said second port and said third port respectively.

According to an aspect, there is provided a method of making a duplexer with cancellation and separation. The method may comprise the steps of modifying a Wilkinson combiner having a first port with first and second quarter wave transformers connected between a second port and said first port and between a third port and said first port respectively and a balancing resistor connected between said second and third ports. The Wilkinson combiner may be modified by connecting a bandpass filter circuit to said second quarter wave transformer and said balancing resistor at one end and the third port at the other end.

The modified Wilkinson combiner may have one or more features attributable to duplexers as described herein.

According to an aspect, there is provided a duplexer comprising first, second and third ports adapted for connection to an uplink and a downlink of a full duplex wireless communication system. The duplexer may comprise first and second quarter wave transformers connected between said first port and said second port and between said first port and said third ports respectively; a filter circuit connected between said second quarter wave transformer and said third port; and a balancing resistor connected between said second quarter wave transformer and said filter circuit at one end and said second port at the other end.

According to an aspect, there is provided a duplexer operative to provide signal cancellation and separation. The duplexer may comprise a cancellation portion and a separation portion, said cancellation portion being operative to cancel all but a selected signal from multiple signals applied thereto, said separation portion being operative to filter out selected signal from non-selected signals.

According to some aspects, the cancellation portion may comprise a Wilkinson combiner as described herein in a cancellation configuration and the separation portion may comprise a filter connected at an outlet of the cancellation portion.

According to an aspect, there is provided a full duplex, two-way communication system comprising a duplexer as described herein, said duplexer being connected between an antenna and a transmit port and a receive port, said duplexer being operative to prevent transmit signals at said transmit port from appearing at said receive port.

According to some aspects, the system may comprise a heterodyne receiver connected to said receive port.

According to some aspects, first and second quarter wave transformers may be located between said transmit port and said receive port and operative to shift the phase of transmit signals 180 degrees in a manner to effectively cancel said transmit signals at said receive port.

According to some aspects, said duplexer transmit and receive ports may be connected such that the phase of any signal transmitted at said transmit port is shifted 180 degrees in a manner to effectively cancel the transmit signal at said receive port.

According to an aspect, there is provided a full duplex wireless communication system in which transmit and receive signals are transmitted between a base station and a plurality of subscriber equipment at first and second frequencies which are vanishingly close, each of said base station and subscriber equipment comprising a cancellation/separation duplexer having a transmit port and a receive port and being operative to shift the phase of any transmit signal at one of said transmit ports 180 degrees at the corresponding receive port.

According to some aspects, the system may comprise cancellation/separation duplexers with first and second quarter wave transformers operative to shift the phase of any transmit signal 180 degrees.

According to some aspects, the subscriber equipment may comprise customer premises equipment mobile devices, or combinations thereof.

According to an aspect, there is provided a full duplex wireless communication system comprising a base station and a plurality of subscriber equipment, each of said base station and subscriber equipment comprising a cancellation/separation duplexer where transmit signals from subscriber equipment and receive signals from said base station are at the same frequency and encoded in first and second encoding techniques, respectively.

According to some aspects, the encoding techniques in the system may be frequency modulation and/or amplitude modulation.

According to some aspects, the subscriber equipment may comprise mobile devices, customer premises equipment, or combinations thereof.

According to some aspects, the system may comprise an antenna and a cancellation/separation duplexer having a transmit and a receive port wherein the impedance of said antenna and said transmit and receive ports are matched.

According to some aspects, the transmit and receive signals may be encoded in CMDA.

According to an aspect, in a full duplex wireless communication system in which transmit and receive signals are transmitted between a base station and individual subscriber equipment at the same frequency, the transmission of transmit and receive signals are encoded in first and second encoding techniques, respectively. The base station and the individual subscriber equipment may each comprise a cancellation/separation duplexer.

According to an aspect, there is provided the transmission of transmit and receive signals at the same frequency encoded in first and second encoding techniques, respectively, in a full duplex wireless communication system.

According to some aspects, the transmission of transmit and receive signals may be in a full duplex wireless communication system that comprises cancellation/separation duplexers.

According to some aspects, the first and second encoding techniques comprised frequency and amplitude modulation.

According to some aspects, the transmit and receive signals may be encoded in CDMA.

According to an aspect, there is provided a full duplex wireless communication system in which signals are transmitted between a base station and a plurality of subscriber equipment at the same frequency, each of said base station and subscriber equipment comprising a cancellation/separation duplexer having a transmit port and a receive port and being operative to shift the phase of any transmit signal at one of said transmit ports 180 degrees at the corresponding receive port.

According to some aspects, the transmit and receive signals may be encoded in first and second different encoding techniques. The transmit and receive signals may be encoded in frequency modulation and amplitude modulation, respectively or in CMDA.

According to some aspects, each of said duplexers may be connected to an antenna and the impedances of the antenna and the receive and transmit ports of the duplexer are the same.

It will be understood that the features described with respect to the duplexers, communication systems, transmissions may be combined in various combinations to be applicable in various situations, as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

Figure 1:
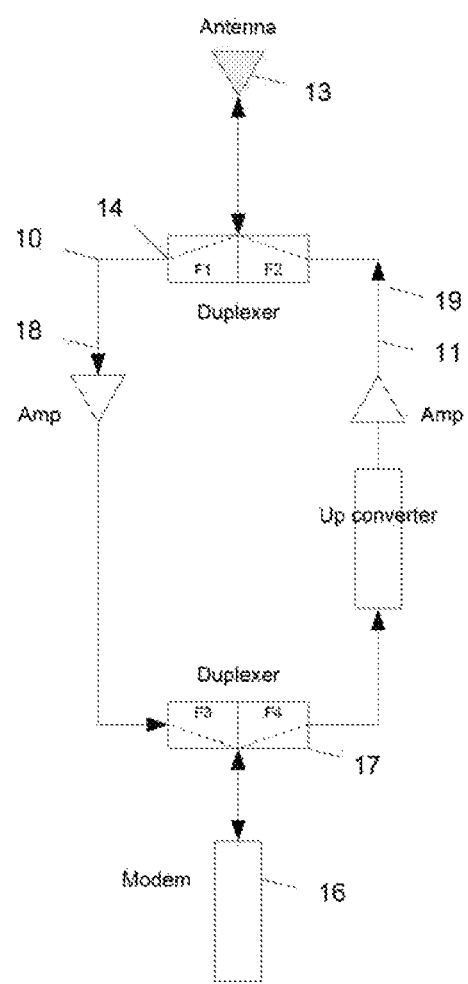
FIG. 1 is a generic block diagram of prior art two way communication system.

FIG. 1 is a block diagram of a generic, prior art, two-way communication system. The system comprises a down link 10 and an uplink 11 connected to an antenna 13 via duplexer 14. The uplink and down link are connected to modem 16 via a second duplexer 17, the signals travelling as indicated by down pointing arrow 18 and up pointing arrow 19 in the down link and up link respectively.

Figure 2:
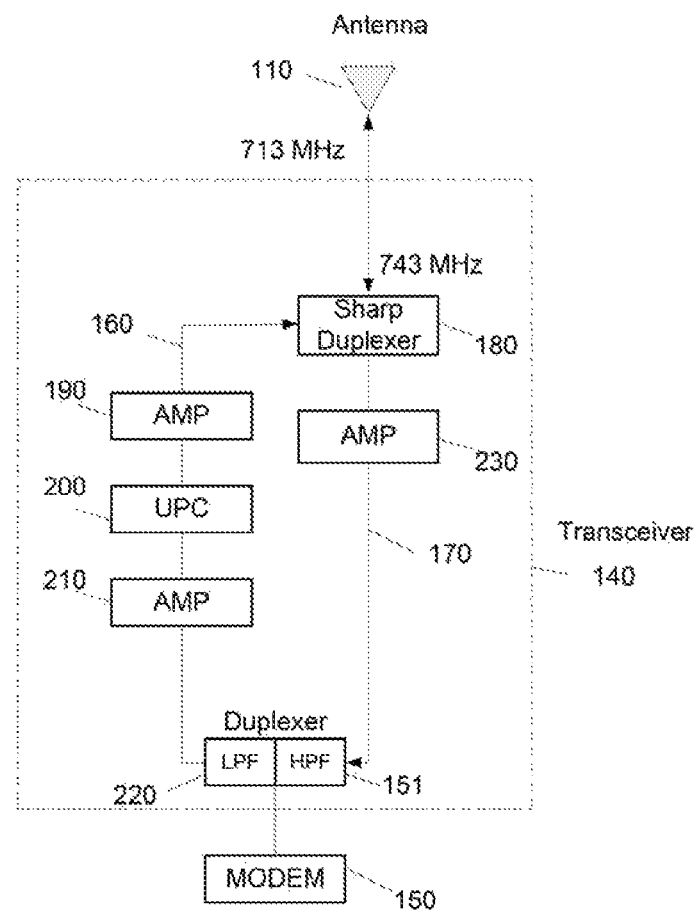
FIG. 2 is a block diagram of a prior art two way communication system for customer premises equipment (CPE)

FIG. 2 is a block diagram of prior art customer premises equipment for an illustrative, prior art, two-way communication system for wireless rural broadband service. The equipment comprises an antenna 110. Transceiver 140 is connected between the antenna and a modem 150. Connection to modem 150 is via duplexer 151.

The transceiver comprises an uplink 160 and a down link 170. Down link 170 and uplink 160 are connected to antenna 110 via duplexer 180. Uplink 160 comprises amplifier 190, up converter (UPC) 200, amplifier 210, and low pass filter 220. Down link 170 comprises amplifier 230. Customer premises equipment herein operates at 743 MHz downstream and 713 MHz up stream and requires a sharp duplexer.

Figure 3:
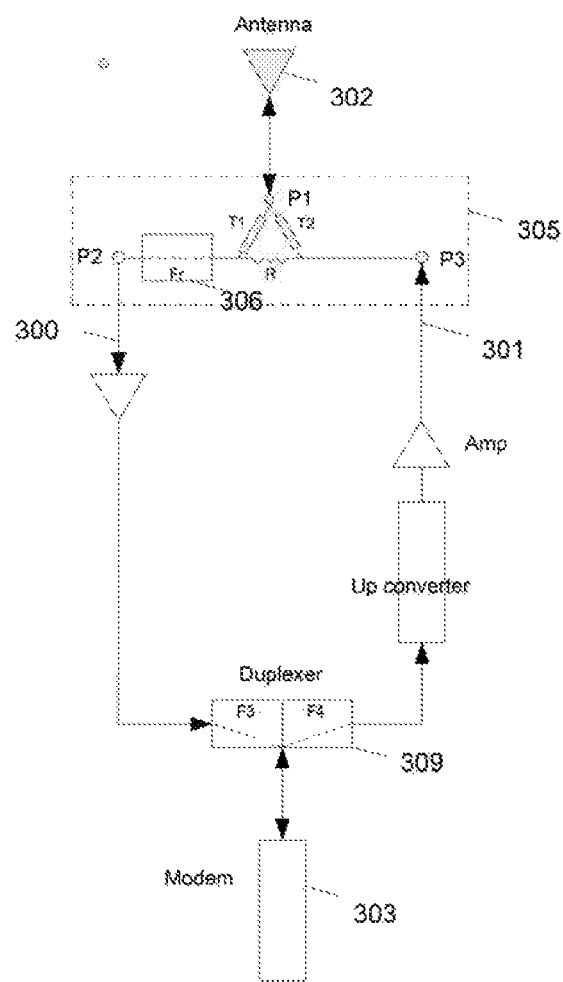
FIGS. 3a and 3b are block diagrams of a generic wireless two way communication system including a cancellation/separation circuit combination and a single stage Wilkinson adapted to that use respectively.
Figure 3:
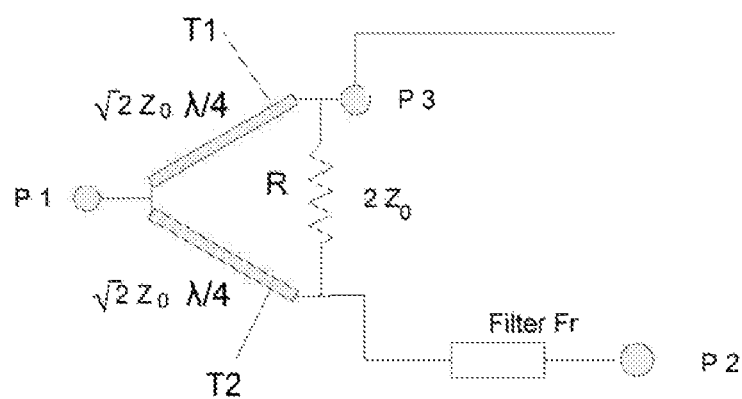

FIG. 3a is a block diagram of the generic two-way communication system of FIG. 1 utilizing a cancellation/separation duplexer instead of a conventional duplexer. The system comprises a down link 300 and an uplink 301 connected between an antenna 302 and a modem 303 (through duplexer 309) as is the case in the prior art system of FIG. 1. But down link 300 and uplink 301 are connected to antenna 302 via a cancellation/separation duplexer 305.

FIG. 3b is a diagram of a Wilkinson combiner adapted by the addition of a filter circuit to form the cancellation/separation duplexer herein. The Wilkinson combiner is used to combine two signals into a single output. The Wilkinson combiner has three ports designated P1, P2 and P3. As shown in the FIG. 3b, quarter wave transformers T1 and T2 are connected between ports P1 and P2 and between ports P1 and P3 respectively. A balancing resistor R is connected between port P2 and port P3.

The Wilkinson combiner with a filter circuit constitutes a "cancellation/separation duplexer".

The cancellation/separation duplexer is connected into any two-way communication system by connecting port P2, in FIG. 3a, to the input to down link 300 and connecting port P3 to uplink 301. As shown in FIG. 3a, downlink 300 and uplink 301 are connected to modem 303, as shown via block 309 in FIG. 3a. Block 309 represents a conventional duplexer. A cancellation/separation duplexer cannot be used for block 309.

Figure 4:
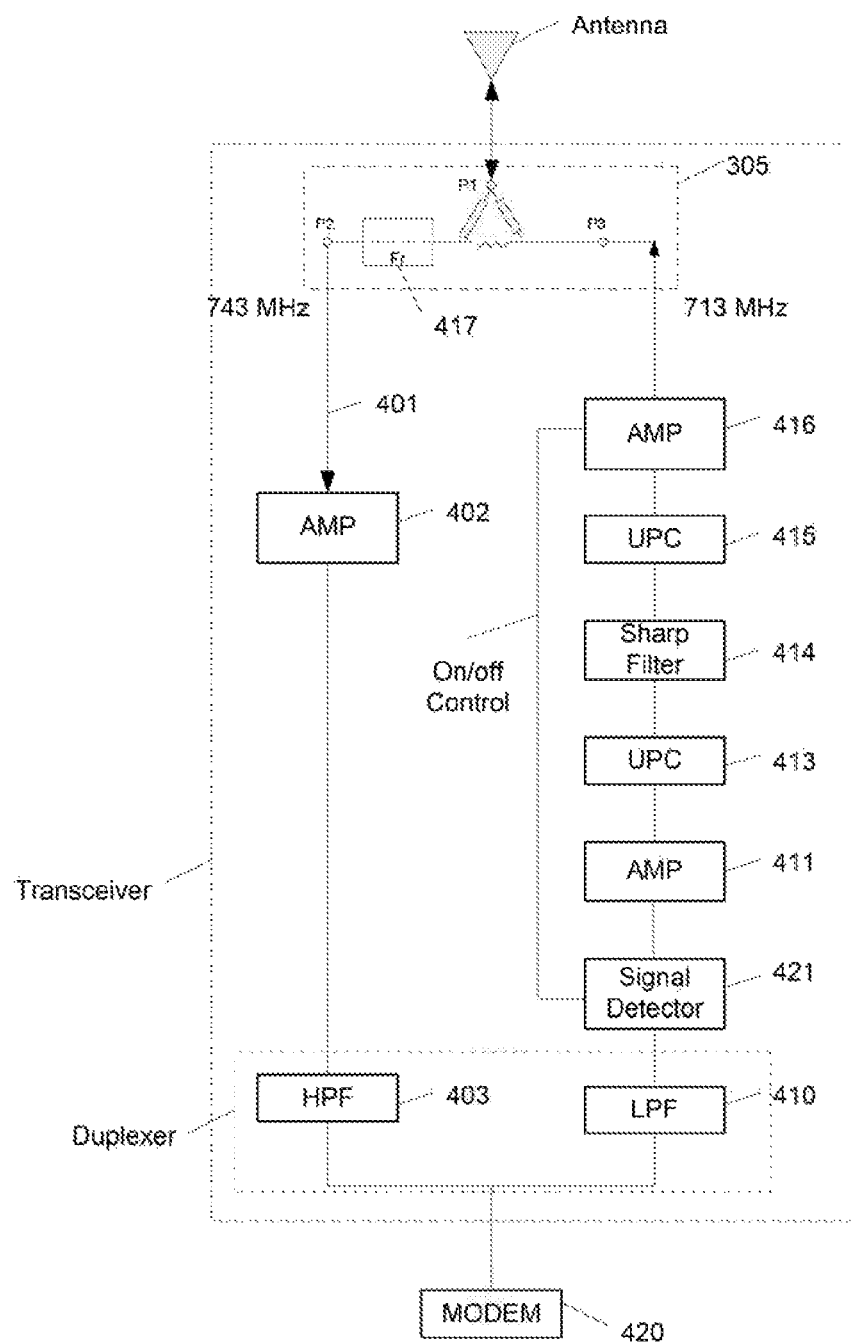
FIG. 4 is a block diagram of the customer premises equipment of FIG. 2 adapted to include a cancellation/separation circuit.

FIG. 4 is a block diagram of customer premises equipment (CPE) for an illustrative rural broadband system using the cancellation/separation duplexer 305 of FIG. 3a. The CPE is operative to receive (downstream) signals at 743 MHz and (upstream) transmit signals at 713 MHz. The down link 401 comprises amplifier 402 high pass filter 403 and filter 417 of the duplexer. The uplink comprises low pass filter 410, amplifier 411, up converter 413, sharp filter 414, up converter (UPC) 415 and amplifier 416.

The uplink includes signal detector 421 connected to amplifier 416 operative to turn amplifier 416 on when a transmit signal is present.

Sharp filter 414 in the CPE illustratively operates at Intermediate Frequency of about 170 MHz suitable for UHF band (470-860 MHz). The filter can be used for each CPE in communication with a base station. The cost of a different duplexer for each CPE is thus eliminated and the use of identical fixed filters instead permits low cost manufacturing to bring the cost down dramatically.

As shown in FIG. 4, filter 414 is sandwiched between first and second up converters 413 and 415. These up converters are programmable, are voltage controlled and inexpensive. They are operative to change the frequency supplied by the modem (5-60 MHz) first to some Intermediate Frequency (170 MHz) and then to the 713 MHz transmit frequency as is explained more fully hereinafter.

Up converter 413 is connected to modem 420 via amplifier 411 and low pass filter 410. Up converter 415 is connected to the antenna via amplifier 416. Signal detector 421 is connected between amplifier 411 and low pass filter 410, and is connected to amplifier 416 via on/off switch (not shown).

The system of FIG. 4 operates to process transmit and receive signals as follows: The receive signal is received at the antenna 113. The signal goes through quarter wave transformer T1 into filter 417. Filter 417 passes the desired receive signal and attenuates all the other signals. The output of filter 417 is then fed into amp 402 that amplifies the signal. The output is fed into high pass filter 403. The output of the high pass filter 403 is connected to modem 420. Modem 420 receives the receive signal and processes the signal internally. The transmit signal is generated by modem 420 and fed into the input of the low pass filter 410. This filter blocks all the receive signal from entering the signal detector 421. The output of the Signal detector is fed into amp 411. The programmable upconverter 413 takes the input signal from amp 411 and translates it to an Intermediate Frequency (170 MHz). The Intermediate Frequency signal is fed into a fixed sharp filter 414. This filter is the same filter used in all the Transceivers regardless of location. The signal is cleaned up by the sharp filter and the output is fed into the programmable upconverter 415 that takes the signal to 713 MHz. This upconverter can be programmed to convert the 170 MHz to any one of the 470-860 MHz UHF band frequencies. The output of the programmable upconverter 415 is fed into amplifier 416. The output of amplifier 416 is only turned on when the signal detector 421 senses an input signal. The output of the amp 416 is fed into port P3 of the Wilkinson combiner 305. The transmit signal fed into port P3 sees 3 dB less at the antenna input. The same transmit signal is seen as being at least 40 dB less at port P2 on the cancellation/separation duplexer. The benefit of this is that even though the transmit signal is large it is seen to be over 40 dB less at port P3 on the Wilkinson combiner that is input port for the receive signal. Effectively using the cancellation/separation duplexer, to connect the antenna cost 3 dB in signal loss for transmit purposes. The Transceiver would have to produce 3 dB additional power to compensate for the loss in the duplexer. The 3 dB loss is easily compensated by outputting additional power on the amp 416 and thereby having the same power input to the antenna. The real benefit is that transmit power seen at input Filter 417 is over 40 dB lower.

The Intermediate Frequency described herein is conveniently chosen to be intermediate the system transmit frequency (470-860 MHz) and 5-60 MHz supplied by the modem at the customer premises. The Intermediate Frequency, on the other hand, may be any convenient frequency, even above the system transmit frequency. In this case, instead of two up-converters, an up converter converts the modem transmit frequency to the Intermediate Frequency and a down converter converts the frequency to the CPE transmit frequency.

Figure 5A:
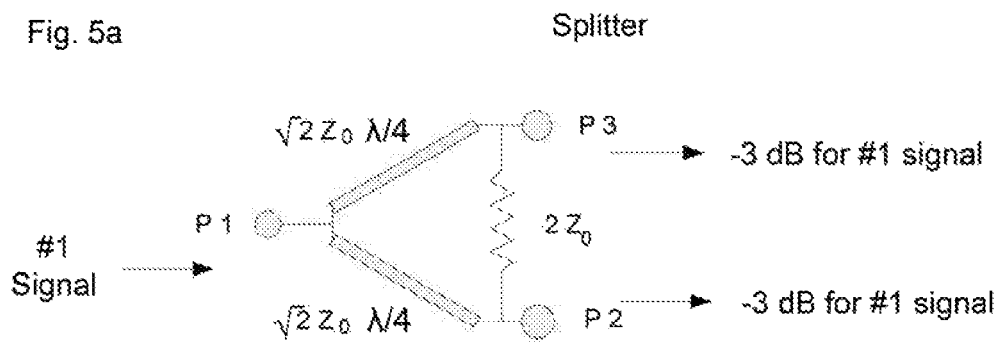
FIGS. 5a, 5b, and 5c are block diagrams of the Wilkinson in various modes of operation.
Figure 5B:
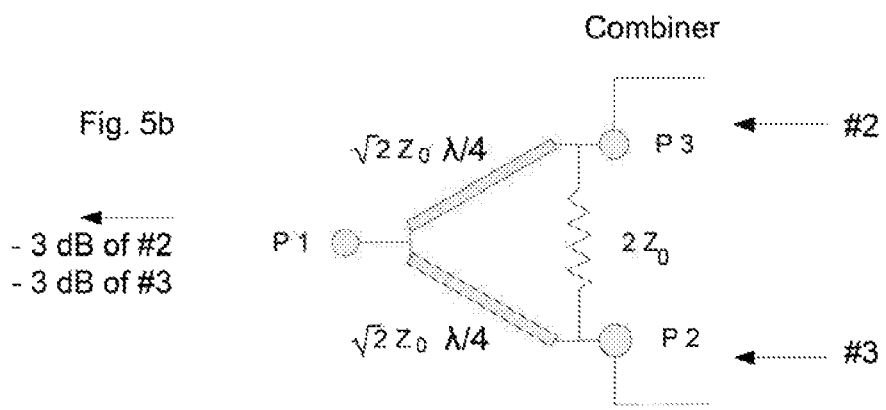
Figure 5C:
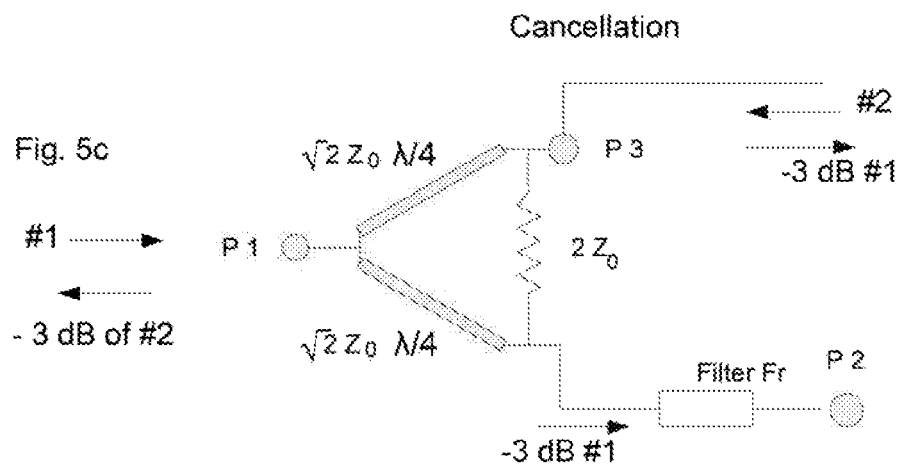

FIGS. 5a, 5b, and 5c show, schematically, the Wilkinson organized as a splitter, a combiner, and as a cancellation/separation device respectively. The arrows in each case represent the direction of data flow. The signals are designated #1, #2, and #3 corresponding to the port designations. It is to be noticed that only FIG. 5c includes a filter which adapts the Wilkinson for use as a duplexer.

Using the cancellation/separation duplexer as disclosed herein, enables mobile devices to become full duplex systems thereby allowing a doubling of data rates due to fact that they can transmit and receive at the same time.

The heterodyne receiver is also well know (i.e. a radio tuner) and is used with the duplexer, disclosed herein, to provide a frequency agile transceiver which is programmable and thus obviates the need for different duplexers in CPE systems as noted above.

The single and multistage Wilkinson combiner also are well known, the latter permitting the frequency band to be made much wider thereby allow the duplexer to operate over a much wider frequency band than is possible with existing duplexers.

The cancellation/separation duplexer allows the use of the same carrier frequency for both transmit and receive.

Normally a receive signal is considerably less in power than the transmit signal. Preferably, the power of the transmit signal at the receive port is 50 dB less due to the 180 degree phase shift (signal cancellation) provided by the cancellation/separator duplexer. Consequently, the power of the transmit and receive signals at the receive port is relatively the same.

To separate the two signals at the receive port, two different modulation techniques are used. Amplitude modulation carrier and frequency modulation carrier were implemented experimentally and provided an additional 20 dB of signal separation, a total effective separation of 70 dB between the signals. It is clear that the same carrier frequency can be used for both transmit and receive by using a Wilkinson combiner/splitter plus a filter to produce the cancellation/separation duplexer. By interfacing to the transmit/receive antenna and by using two different modulation techniques over 70 dB of separation is obtained.

The 70 dB of separation has also been achieved by tuning the impedance of the transmit and receive ports to exactly match that of the antenna. With exact matched impedance plus the use of two different modulation techniques an extremely robust wireless system using the same carrier frequency is provided.

CDMA is an example of multiple access where several transmitters can send information simultaneously over a single communication channel. This allows several users to share a band of frequencies. To permit the band sharing without undue interference between the users, CDMA employs spread spectrum technology and a special coding scheme where each transmitter is assigned a code. Using CDMA with different coding for the transmit and receive channels the receive code can be separated from the transmit code using a Wilkinson combiner/splitter plus a filter to produce the cancellation/separation duplexer. With exact impedance matching CDMA can be used to provide an extremely robust wireless system using the same carrier frequency for both transmit and receive channels.

What has been described is considered merely illustrative of the principles of this invention. Thus, it should be understood that those skilled in the art are capable of producing modifications thereof within the scope of the claims. For example, a tower of a base station communicating with a plurality of CPEs may include a single antenna with a cancellation/separation duplexer, as disclosed herein, instead of the two-antenna system disclosed in the above mentioned co-pending patent application. Furthermore, multiple balancing resistors may be employed herein to provide for a relatively wide frequency response as is well understood with Multistage Wilkinson devices.

Although the invention herein is described in terms of providing cancellation/separation of in excess of 120 dB, it is be understood that the duplexer can be configured with different choices of filters to be operative with lower/higher levels of separation.

What is claimed is:

1. A duplexer having first, second and third ports and adapted for connection between an antenna and uplink and downlink, respectively, in a full duplex communication system, said duplexer comprising:
    first and second quarter wave transformers connected between said first and third ports and between said first and second ports, respectively;
    a balancing resistor connected between said third port and the output of said second transformer; and
    a filter circuit connected between said output of said second transformer and said second port.

2. The duplexer as in claim 1 wherein said filter circuit comprises a bandpass filter.

3. The duplexer as in claim 1 wherein said filter circuit comprises a heterodyne receiver.

4. The duplexer as in claim 1, further comprising an antenna connected to said first port of the duplexer, and an uplink and a downlink of a two-way communication system connected to said third port and said second port, respectively.

5. The duplexer as in claim 4, wherein said antenna is located exterior to a customer premises in a wireless full duplex communication system between equipment in each of a plurality of customers premises and a tower in the base station of said system, said combination in each of the customer premises equipment comprising a heterodyne circuit for providing a frequency agile circuit for passing each frequency of each different pair of spaced apart frequencies assigned to each of said customers.

6. The duplexer as in claim 4, wherein the duplexer and the antenna are provided in a mobile device.

7. The duplexer as in claim 6, comprising a plurality of mobile devices in communication with a base station.

8. A full duplex wireless communication system in which transmit and receive signals are transmitted between a base station and a plurality of subscriber equipment at first and second frequencies, each of said base station and subscriber equipment comprising a cancellation/separation duplexer having a transmit port and a receive port and being operative to shift a phase of any transmit signal at one of said transmit ports 180 degrees at the corresponding receive port, and the cancellation/separation duplexers having first and second quarter wave transformers operative to shift the phase of any transmit signal 180 degrees.

9. The system as in claim 8 in which said subscriber equipment comprises customer premises equipment.

10. The system as in claim 8 in which said subscriber equipment comprises mobile devices.

11. A full duplex, two-way communication system comprising:
    a duplexer operative to provide signal cancellation and separation, said duplexer comprising a cancellation portion and a separation portion, said cancellation portion comprising first and second quarter wave transformers located between said transmit port and said receive port and operative to shift the phase of transmit signals 180 degrees in a manner to effectively cancel said transmit signals at said receive port such that all but a selected signal from multiple signals applied thereto is cancelled, and said separation portion being operative to filter out the selected signal from non selected signals;

wherein said duplexer is connected between an antenna and a transmit port and a receive port, said duplexer being operative to prevent transmit signals at said transmit port from appearing at said receive port.

12. The full duplex, two-way communication system as in claim 11 comprising a heterodyne receiver connected to said receive port.

13. The full duplex, two-way communication system as in claim 11, wherein said duplexer transmit and receive ports are connected such that a phase of any signal transmitted at said transmit port is shifted 180 degrees in a manner to effectively cancel the transmit signal at said receive port.

* * * * *